Nov. 4, 1930.  W. H. WHEATLEY  1,780,805
METHOD OF MAKING HELICAL CUTTERS
Filed March 30, 1927   2 Sheets-Sheet 1

Inventor
W. H. Wheatley
by Wilkinson & Huota
Attorneys.

Nov. 4, 1930.    W. H. WHEATLEY    1,780,805
METHOD OF MAKING HELICAL CUTTERS
Filed March 30, 1927    2 Sheets-Sheet 2

Inventor
W. H. Wheatley
by Wilkinson & Giusta
Attorneys.

Patented Nov. 4, 1930

1,780,805

UNITED STATES PATENT OFFICE

WALTER HARRY WHEATLEY, OF LONDON, ENGLAND, ASSIGNOR TO WHEATLEY PATENTS LTD., OF LONDON, ENGLAND, A CORPORATION OF ENGLAND

METHOD OF MAKING HELICAL CUTTERS

Application filed March 30, 1927, Serial No. 179,651, and in Great Britain July 21, 1926.

This invention relates to rotary helical cutters and to a method of making same and more particularly to a rotary cutter which is adapted to cut all the teeth of a helical or spiral or straight bevel gear in a single continuous operation, such for example, as the cutter described in the specification of the co-pending application for United States of America Letters Patent Serial No. 3395, filed 19th January 1925 which has matured into Patent Number 1,649,631, granted November 15, 1927.

In the aforesaid specification, a cutter of this type is described in which the cutting teeth arranged in a helical path are adapted to co-operate in pairs, each pair being shaped to cut to correct shape the opposite sides of the groove between a pair of teeth at a particular point in the length of the groove.

The objects of the invention art to produce an improved form of helical cutter and also a method of making the cutter, said method also being adapted to produce a cutter of the kind described in the aforesaid specification.

According to the present invention, the improved cutter comprises a helix formed of a single thread which may extend completely round the cutter providing a series of cutting teeth having cutting edges on each side, the cross sections of the teeth gradually diminishing in size from the center of the helix to the two ends thereof, the pitch of the helix being equal to or less than the pitch at the smaller end of the bevel wheel or the like to be cut. The teeth of such a cutter when suitably shaped are adapted to cut all the teeth on a bevel wheel or other article in a single continuous operation by continuously rotating the cutter and a blank, the cutter making one revolution while the blank revolves through the pitch of one tooth to be cut and the cutter being fed once over the blank.

In a suitable method according to the invention, the cutter is generated, or the teeth of the cutter are shaped, by forming a master bevel or other gear wheel accurately shaped to the gear which the cutter is designed to cut and providing it with cutting teeth so that when a roughed out helical cutter is applied to the master wheel and the two rotated and moved relatively at the proper speed, the cutter will be shaped accurately so that in turn it may be used for cutting a gear corresponding to the master gear wheel. The roughed out cutter is formed with a single thread helix before being applied to the master wheel as hereinafter fully described.

If it is desired to form the cutter described in the aforesaid specification, the correctly shaped helix formed on the cutter blank is cross cut and the teeth backed off and provided with the necessary cutting edges described in the aforesaid specification.

To enable the invention to be fully understood it will now be described by reference to the accompanying drawings in which:—

Figure 1:
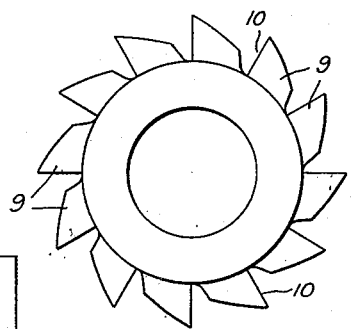
Fig. 1 is a side elevation of an improved cutter according to the invention.
Figure 2:
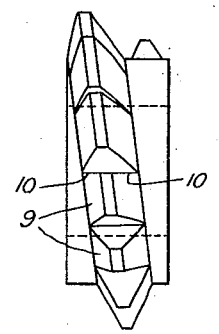
Fig. 2 is a front elevation thereof.

As shewn in Figs. 1 and 2, the cutter comprises a series of teeth 9 arranged in a helical path with cutting edges 10 on each side. The cross sections of the teeth 9 diminish in size from the centre of the helix towards the two ends thereof, the pitch of the helix being equal to the pitch at the smaller end of the bevel wheel or other object to be cut.

If the teeth 9 are suitably shaped, all the teeth on a bevel wheel or other article can be cut in a single continuous operation as hereinbefore described.

Such a cutter for use in cutting a bevel gear may be generated as follows:—

Figure 5:
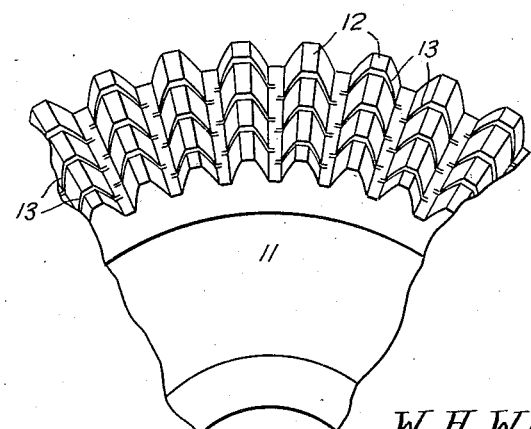
Fig. 5 is a view shewing a portion of a straight toothed master bevel wheel.

As shewn in Fig. 5, a master bevel gear wheel 11 is first cut and shaped on any suitable machine to correspond accurately to the gear which the cutter is designed to cut. In the example shewn, the wheel 11 has straight teeth 12. The teeth 12 are formed with staggered serrations 13 to form cutting edges which may be slightly relieved and the wheel is then hardened and finished to correct shape preferably by grinding.

Figure 3:
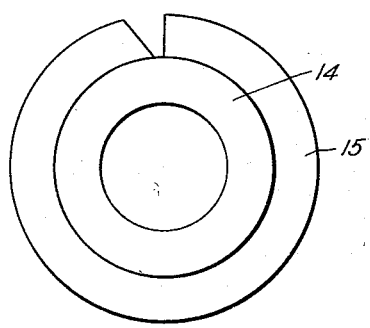
Figs. 3 and 4 are views similar to Figs. 1 and 2 respectively, of a roughed out cutter blank for forming a cutter according to the invention.
Figure 4:
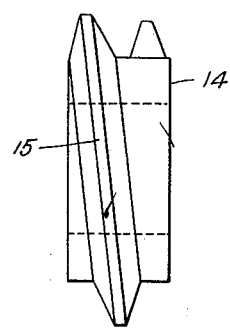
Figure 9:
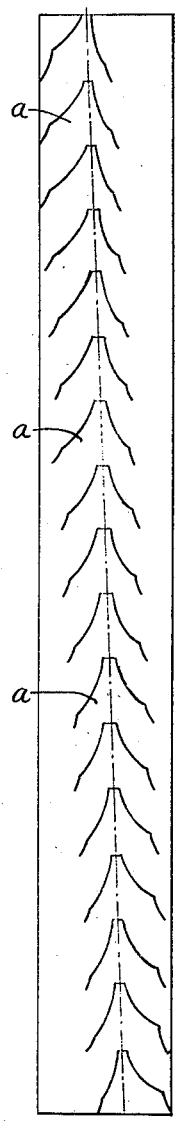
Figure 9 is a development of a cutter according to the invention.

A cutter blank 14, Figs. 3 and 4, is roughed out and is formed with a rough helix 15, the pitch of which corresponds to the inside or minor pitch of the gear to be cut. The helix 15 may then be cross-cut to divide it into the desired number of teeth, or if desired this cross cutting may be left until the helix has been finally shaped by the master wheel.

The master wheel 11 is placed on the work head of a suitable gear cutting machine and the roughed out cutter 14 on the cutter arbor, the gearing of the machine being arranged at the required ratio. The roughed out cutter 14 is then fed once across the master wheel 11 at a suitable speed with its helix in mesh with the wheel teeth, the wheel 11 and cutter 14 being continuously rotated, the cutter making one revolution while the wheel turns through the pitch of one tooth.

The cutter is fed in a direction perpendicular to its axis, and with this axis moving in a plane parallel to a plane which is tangential to the cone containing the bottoms of the teeth of the wheel.

Figure 6:
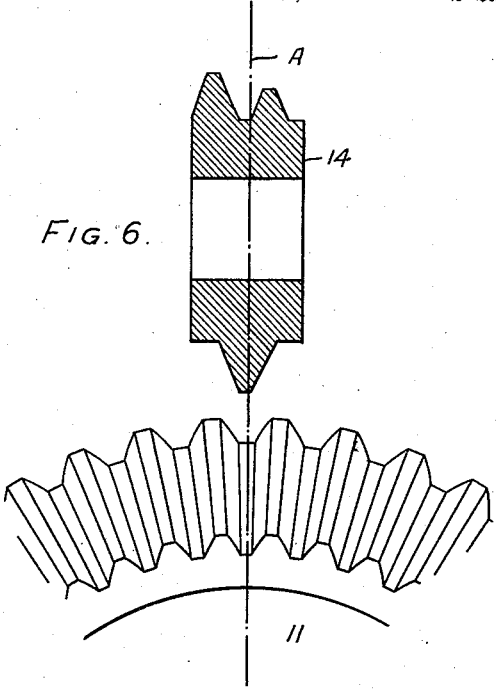
Fig. 6 is a view partly in section shewing the roughed out cutter in position over the master wheel to produce a cutter for cutting straight toothed bevel gears.

If the cutter to be made is required to cut straight teeth on bevel gears it is set up for generating purposes relatively to the master wheel as shewn in Fig. 6, that is to say, so that the central plane of the cutter perpendicular to its axis indicated by the dotted line A contains the axis of the wheel 11.

Figures 7, 8:
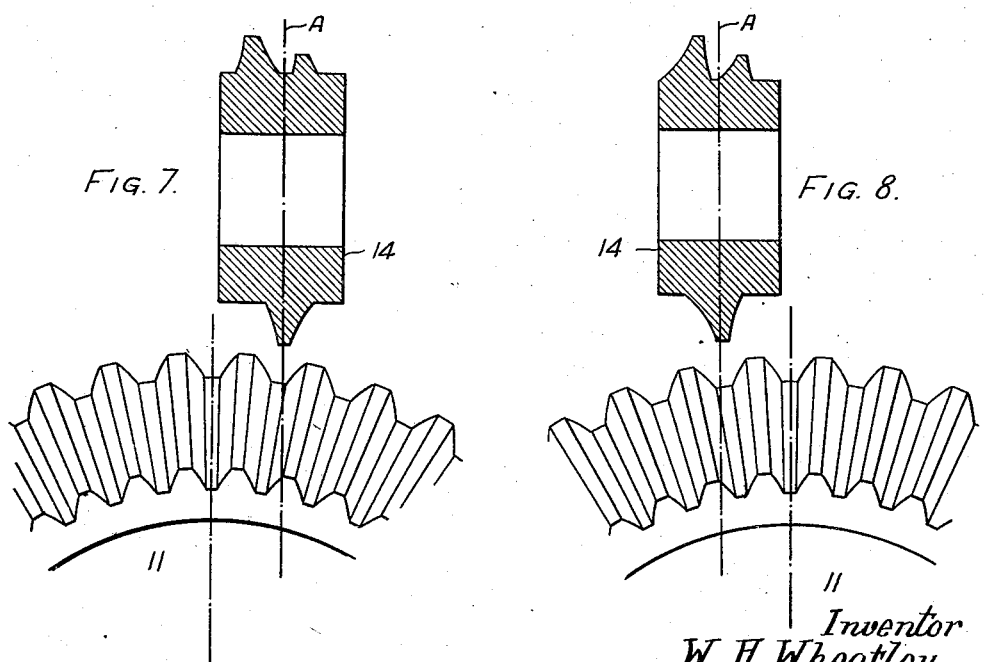
Fig. 7 is a view similar to Fig. 6, but shewing the arrangement for producing a cutter for cutting left-hand spiral teeth.
Fig. 8 is a view similar to Fig. 7, but shewing the arrangement for producing a cutter for cutting right-hand spiral teeth.

If the cutter is required to cut left-hand spiral teeth the plane indicated by the line A must be offset with regard to the axis of the wheel 11 as shewn in Fig. 7 and for right-hand spiral teeth the plane A must be offset as shewn in Fig. 8.

The amount of this offset differs according to the pitch of the tooth to be cut.

During the shaping operation the cutting edges of the serrations 13 correctly shape the helix 15 for the particular work for which it is intended and the helix is then cross cut to form the desired number of teeth, if this has not already been done, and the teeth are then relieved in such a manner that when ground they retain their correct shapes, after which the cutter is hardened.

It is preferable that the cutter when finished should have an odd number of teeth thereon so that when setting up the cutter for cutting a blank the central tooth of the cutter can be set on the central line of the blank as this tooth always follows the central line of a tooth space in the gear to be cut. Obviously the finished helix on the cutter may be cross-cut and the teeth so formed shaped to produce the cutter described in the aforesaid specification. Further, although the invention has been described in connection with the production of bevel gear wheels it will be understood that a rotary helical cutter for producing straight, spiral or helical teeth on any conical or flat surface may be generated according to the invention by making a suitable master wheel. For example, a cutter for forming the teeth on the flat face of a dog clutch may be generated and in this connection a flat plate may be regarded as a cone having an apex angle of 180°.

It is preferable that cutters intended for cutting spiral teeth should be generated from a spiral master gear wheel, but good results have been obtained from a straight toothed master gear wheel. The master wheel and the cutter are formed of steel or other suitable material.

It is to be understood that the term "master wheel" in the appended claims includes a bevel wheel or other toothed article such, for example, as the toothed plate of a clutch.

Having thus described the nature of my said invention and the best means I know of carrying the same into practical effect, I claim:—

1. That method of making a rotary helical cutter by use of a toothed master bevel wheel with teeth in staggered formation to provide cutting edges, the master wheel being hardened and finished to correct shape, comprising roughing out a helical cutter blank having a single thread helix corresponding in pitch to the minor pitch of the master wheel, placing the master wheel and the helical cutter blank in the gear cutting machine, feeding the helical cutter blank over the master wheel and rotating the blank and the master wheel at relative speeds to cause the helical cutter blank to make one complete revolution during the turning of the master wheel through a distance equal to the pitch of one tooth, to generate on the helical cutter blank a helix of correct shape, and cross-cutting the helix formed on the helical cutter blank to the desired number of cutting teeth.

2. That method of producing a helical cutter for cutting the teeth of helical, spiral and straight bevel wheels, which comprises roughing out a helix blank having a single thread helix, applying a master bevel toothed cutter wheel to the roughed out helix and turning the same at relative speeds for rotating the roughed out helix one complete revolution while the master cutter wheel rotates through a distance of the pitch of one tooth whereby to generate the helix on the cutter to correct shape and decreasing cross-sectional area from the center to the ends of the helix, and cross-cutting the helix of the cutter at spaced intervals to form spaced teeth with cutting edges.

3. That method of producing a helical cutter which comprises forming a cutter blank with a roughed out single thread helix thereon, cutting the helix with a master bevel gear cutter having a minor pitch equal to or greater than the pitch of the roughed out helix and by rotating the helix and the master wheel at relative speeds to advance the roughed out cross-cut helix one complete revolution during the advance of the master gear wheel cutter through a distance equal to the pitch of one tooth thereof to generate on the cutter a helix of correct shape, the central plane perpendicular to the axis of the roughed out helix being positioned in a plane parallel to a plane containing the axis of the master cutter and normal to the axis of the roughed out helices to form a cutter for producing right or left hand spiral teeth, and cross-cutting the roughed out helix to form spaced teeth with cutting edges.

4. A method of producing a rotary cutter of the kind referred to which comprises using a toothed master wheel to correspond accurately with the gear or other object which the cutter is designed to cut and having teeth in staggered formation to form cutting edges which may be relieved if desired and hardened and finished to correct shape preferably by grinding, comprising roughing out a cutter from a blank by forming a single thread helix thereon, the pitch of which is equal to the inside or minor pitch of the gear or other object to be cut, placing the master wheel and the cutter blank in position in a suitable gear cutting machine, feeding the cutter over the wheel at a suitable speed and rotating the wheel and the cutter at such a speed that the cutter makes one revolution while the wheel turns through the pitch of one tooth, thus generating on the cutter a helix of correct shape which is then cross-cut to form the desired number of cutting teeth which are then relieved in such a manner that when ground they retain their correct shape.

5. That method of producing a helical cutter which comprises forming a cutter blank with a roughed out single thread helix thereon, cutting the helix with a master bevel gear cutter having a minor pitch equal to or greater than the pitch of the roughed out helix and by rotating the helix and the master wheel at relative speeds to advance the roughed out helix one complete revolution during the advance of the master gear wheel cutter through a distance equal to the pitch of one tooth thereof to generate on the cutter a helix of correct shape, the central plane perpendicular to the axis of the roughed out helix being positioned in a plane containing the axis of the master cutter to form a cutter for producing straight teeth, and cross-cutting the roughed out helix to form spaced teeth with cutting edges.

In testimony whereof I have signed my name to this specification.

WALTER HARRY WHEATLEY.